US012688390B2

(12) United States Patent
Baldischweiler et al.

(10) Patent No.: US 12,688,390 B2
(45) Date of Patent: Jul. 21, 2026

(54) STABILISING THE CONTACTLESS POWER SUPPLY OF THE CHIP OF A CHIP CARD AND CORRESPONDING CHIP CARD

(71) Applicant: GIESECKE+DEVRIENT EPAYMENTS GMBH, Munich (DE)

(72) Inventors: Michael Baldischweiler, Munich (DE); Paul Wurstle, Munich (DE)

(73) Assignee: GIESECKE+DEVRIENT EPAYMENTS GMBH, Munich (DE)

( * ) Notice: Subject to any disclaimer, the term of this patent is extended or adjusted under 35 U.S.C. 154(b) by 0 days.

(21) Appl. No.: 19/110,149

(22) PCT Filed: Sep. 13, 2023

(86) PCT No.: PCT/DE2023/100680
§ 371 (c)(1),
(2) Date: Mar. 10, 2025

(87) PCT Pub. No.: WO2024/067912
PCT Pub. Date: Apr. 4, 2024

(65) Prior Publication Data
US 2026/0087294 A1      Mar. 26, 2026

(30) Foreign Application Priority Data

Sep. 26, 2022    (DE) ..................... 10 2022 003 525.1

(51) Int. Cl.
*G06K 19/07*              (2006.01)
(52) U.S. Cl.
CPC ..... *G06K 19/0715* (2013.01); *G06K 19/0723* (2013.01)
(58) Field of Classification Search
CPC ....................... G06K 19/0715; G06K 19/0723
(Continued)

(56) References Cited

U.S. PATENT DOCUMENTS 5,603,114 A  *  2/1997  Tomita ................. H03G 3/3052
                                                        455/249.1
8,207,831 B2 *  6/2012  Ganz .................. G06K 19/0723
                                                        329/347
(Continued)

FOREIGN PATENT DOCUMENTS

DE      112016001481 B4      8/2021
EP          1474776 B1      11/2008
EP          3979134 A1       4/2022

OTHER PUBLICATIONS

Roland, et al., "Evaluation of Contactless Smartcard Antennas", University of Applied Sciences Upper Austria, Revision 1.0, Jun. 11, 2015, 30 pages.

(Continued)

*Primary Examiner* — Daniel A Hess
(74) *Attorney, Agent, or Firm* — Workman Nydegger

(57)                ABSTRACT

A method is implemented by a chip embedded in a chip card to adjust the internal supply voltage of the chip based on the strength of an external electromagnetic field that powers the chip. The internal supply voltage can be lowered by toggling a reduction in the threshold voltage. The chip includes a sensor register displaying a field strength value dependent on the external field strength and the adjusted internal supply voltage. Additionally, a corresponding computer program product, a storage medium containing the computer program product, a method for setting up the chip within the chip card using the storage medium to execute the method for adjusting the internal supply voltage, as well as a chip card featuring the chip, in which the method for adjusting the internal supply voltage of the chip is implemented, are also provided.

13 Claims, 4 Drawing Sheets

(58) Field of Classification Search
USPC ......................................................... 235/492
See application file for complete search history.

(56) References Cited

U.S. PATENT DOCUMENTS

| | | | |
|---|---|---|---|
| 8,527,795 B2 | 9/2013 | Howard et al. | |
| 9,658,634 B2 | 5/2017 | Tripathi et al. | |
| 11,307,635 B2 | 4/2022 | Almers et al. | |
| 2016/0043712 A1 | 2/2016 | Okuda | |
| 2016/0291625 A1 | 10/2016 | Tripathi et al. | |
| 2020/0127629 A1* | 4/2020 | Rokhsaz ................... | H03J 3/20 |
| 2020/0274538 A1 | 8/2020 | Zerbe et al. | |
| 2021/0239744 A1 | 8/2021 | Lim et al. | |

OTHER PUBLICATIONS

German Search Report from corresponding DE Application No. 102022003525.1, Jul. 13, 2023.
International Search Report from corresponding PCT Application No. PCT/DE2023/100680, Jan. 3, 2024.

* cited by examiner

STABILISING THE CONTACTLESS POWER SUPPLY OF THE CHIP OF A CHIP CARD AND CORRESPONDING CHIP CARD

BACKGROUND

The invention relates to a method for adjusting the internal supply voltage of the chip of a chip card based on the field strength of an external electromagnetic field supplying the chip with power, a corresponding computer program product, a storage medium having the computer program product, a method for configuring the chip of the chip card with the storage medium to carry out the method for adjusting the internal supply voltage of the chip, and a chip card having the chip, in which the method for adjusting the internal supply voltage of the chip is implemented.

Chip cards, also known as smart cards or integrated circuit cards (ICC), are card-shaped data media which are used in many areas, especially in security-critical applications, e.g. in payment methods for carrying out cashless payment transactions, for forgery-proof identification of persons, e.g. as ID documents, or as proof of authorization, e.g. as proof of access authorizations, to name but a few, non-exhaustive examples. ISO/IEC 7810, for example, as an international standard, defines four formats for identity documents—ID-1, ID-2, ID-3, and ID-000—, where ID-1 relates to the known bank card, credit card, and check card format.

A chip card has a card body and an integrated circuit (chip) embedded in the card body, e.g. in the form of a chip module. The chip module is typically inserted into a cavity or module opening of the card body. A chip card is physically a card having a chip built into it and containing at least one hardware logic, but usually a microprocessor (or microcontroller), as well as a non-volatile memory (electrically erasable programmable ROM, EPROM or electrically alterable programmable ROM, EAPROM). Chip cards can be activated with and can communicate with card readers configured for this purpose.

Chip cards or chip modules are considered below, into which a coil is integrated, and which are configured for contactless communication via an external electromagnetic field and are supplied by this field with the power required for their operation; a chip card controller having the "identification using electromagnetic waves" (RFID) functionality can be cited as an example here. A chip card considered here can also be a card having dual interface (DI) functionality, i.e. similarly having mechanical-electrical contacts for contact-based communication with an associated reader. Further information can be found, for example, in the international ISO/IEC 14443 standards series for contactless chip cards. ISO/IEC 14443 designates a reading unit as a PCD (proximity coupling device) and the chip card as a PICC (proximity integrated circuit card), wherein the permissible reading distance in the closest proximity for reliable reading is between a few centimeters and direct contact.

Chip cards exist in which the power management in contactless mode, also referred to as CL mode for short, itself must be carried out by software. For this purpose, the chip has sensor registers, in which the current field strength of the external electromagnetic reading field detected by means of a sensor is stored as an absolute or relative value, shunt registers, the bits of which connect or disconnect additional load resistors to/from the chip, and supply voltage registers, which enable modification of the internal supply voltage in the chip. A register is essentially a storage area for data which the hardware logic or the microprocessor (or microcontroller) of the chip can access particularly quickly, wherein the register is essentially a storage location having a physical or logical storage address. This makes it possible to take actions affecting the power consumption in CL mode via software. This is necessary given that, in contactless mode, the chip absorbs all the power it receives from a contactless reader PCD. If the chip is "saturated", i.e. the chip cannot convert the supplied power completely into computing power, additional ohmic resistors (shunts) are activated to convert the excess power into heat and thus protect the chip from damage.

Conversely, in order for the chip to work even in a weak electromagnetic field, it is possible to use software to reduce the internal threshold voltage in the chip, i.e. to reduce the level of the internal supply voltage from which the chip starts to operate. The chip then operates internally with a reduced supply voltage; for example, no longer with 1 V, but even with 0.85 V, i.e. the reduction here is 0.15 V.

However, the internal supply voltage of the chip may only be reduced in the weak field. For field strengths above a certain value, e.g. 1.5 A/m, the supply voltage must be reset to the default value, i.e. the reduction must be deactivated, otherwise damage can occur in the chip. The switching point or, more precisely, the switching threshold is critical. If the reduction in the supply voltage is deactivated when the external field strength is too low, the chip can "stall", i.e. fail, since, due to the switch to the normal supply voltage, the chip immediately requires more power, because, for example, the transistors absorb more power at the higher supply voltage. On the other hand, failure to switch to the normal supply voltage in a timely manner can result in excessive power consumption due to the high field strength of the external electromagnetic field and in damage to the chip.

Regulation of the internal supply voltage is further hampered since the changes in the field strength of the external field are not readily predictable. The chip card is therefore held by a person in the reader field, which in itself causes fluctuations in the CL field, particularly because a transaction can take up to 1 second. The method has an additional effect, for example, if a transaction is carried out as a PCD at a point-of-sale (POS) terminal. The POS terminal is initially activated in a first step. In a second step, the customer manually presents the chip card to the POS terminal. In the time period until the card has reached its final position at the POS terminal, the CL field acting at the location of the chip card changes constantly. In addition, the POS terminal itself can also be moved manually by the salesperson toward the chip card.

All of the above-mentioned relevant circumstances for the adjustment of the internal supply voltage of the chip together with the fluctuations in the field strength of the external electromagnetic field during the above-mentioned typical sequence of a payment transaction appear to cause transaction cancelations at POS terminals.

SUMMARY

The object of the present invention is therefore to propose a method for ensuring the maximum stability of a power supply of the chip of a chip card with an adjustable internal supply voltage depending on the field strength of the external electromagnetic field supplying the chip with power.

Features and details described in connection with the method according to the invention also apply in connection with the chip card according to the invention, the computer program and the storage medium and vice versa, so that, with regard to the disclosure, reciprocal reference can always be made to the individual aspects of the invention.

One basic concept of the present invention is to control the internal supply voltage of the chip of the chip card by means of a software-based control circuit such that the power supply of the chip remains as stable as possible in the event of fluctuations in the external field strength "seen" by the chip card.

For the design of the software-controlled regulation of the internal supply voltage proposed here through activation or deactivation of a reduction in the internal supply voltage with which the chip operates, a plurality of technical considerations and findings were necessary and are explained below.

As described above, the voltage threshold from which the chip starts to operate can be reduced through software in the chip cards considered here, so that the chip can be used even in a weak electromagnetic field. In effect, the chip operates internally with a reduced supply voltage. The activation of the internal supply voltage reduction, i.e. the threshold voltage reduction, should be carried out only in the weak field, so that the chip does not suffer damage at higher external field strengths. This means that, if an external field strength exceeds a certain value, the threshold voltage reduction should be deactivated once more and the internal supply voltage should therefore be reset to the default value.

However, the inventors have found that reducing the internal supply voltage also affects all sensors of the chip, including the sensor register, which indicates the current external electromagnetic field strength. This can be briefly explained using an example.

It is assumed that the internal supply voltage of the chip is not reduced, i.e. the threshold voltage reduction is not active, and an external field strength of 1 A/m prevails. The sensor register then indicates e.g. a value of "0x03". If the threshold voltage reduction is then activated, i.e. the internal supply voltage is reduced, the value "0x07" is indicated by the sensor register with the same external field strength of 1 A/m. The threshold voltage reduction therefore resulted in the sensor register indicating to the chip a higher external field strength than the field strength actually present. As noted above, the threshold voltage may be reduced only in a weak electromagnetic field. At field strengths above a certain value, assuming e.g. 1.5 A/m, the threshold voltage must be increased again, i.e. the reduction must be deactivated and the internal supply voltage must be reset to the default value, otherwise damage can occur in/on the chip. The switching threshold is critical here, since, if the deactivation of the threshold voltage occurs when the external field strength is too low, i.e. occurs too early, the chip "stalls" due to its then excessive internal power consumption, since the chip converts more power at the normal internal supply voltage. If the threshold voltage reduction is deactivated too late, the chip can be damaged due to excessive power consumption.

In addition, the software-based regulation of the internal supply voltage is made more difficult by the activation/deactivation of the threshold voltage reduction, since fluctuations in the field strength of the external electromagnetic field supplying the chip with power depend on various factors and are therefore barely predictable. The very fact that the chip card is guided manually by a person through the reader field in the direction of the POS terminal and a transaction can take up to 1 second already causes fluctuations in the field strength of the external CL field. It is also not uncommon for the salesperson at a POS to move the POS terminal as a hand-held device toward the customer's chip card, so that both the chip card and the POS terminal are moving during the transaction. Finally, the contactless payment transaction process at a POS terminal inevitably results in a fluctuation in the field strength of the CL field. Usually, the POS terminal is initially activated in a first step and then, in a second step, the customer presents the chip card to the POS terminal and, if necessary, the salesperson moves the POS terminal toward the chip card. In the time period until the card has reached its final position at the POS terminal, the CL field which the chip card itself sees changes as the distance between the chip card and the POS terminal changes.

All of the above-mentioned technical relationships and processes must be taken into account so that there are no possible transaction cancelations during a transaction at the POS terminal due to excessive fluctuations in the internal supply voltage of the chip.

A first aspect of the invention relates to a method for adjusting the internal supply voltage of the chip of a chip card based on the field strength of an external electromagnetic field supplying the chip with power, wherein the method is implemented by the chip. The internal supply voltage of the chip is reducible through activation and deactivation of a threshold voltage reduction. The chip has a sensor register which indicates a field strength value which is dependent on the field strength of the external electromagnetic field and the adjusted internal supply voltage. The method comprises the following steps:

a step A, comprising activating the threshold voltage reduction for the first time if the field strength value in the sensor register is less than a predetermined first switching threshold;

a step B, comprising deactivating the threshold voltage reduction for the first time as soon as the field strength value in the sensor register is greater than or equal to the first switching threshold; and a step C, comprising setting a predetermined second switching threshold for each further activation of the threshold voltage reduction while retaining the first switching threshold for each further deactivation of the threshold voltage reduction, wherein the second switching threshold is lower than the first switching threshold.

A threshold value register, which is writable in order to activate and deactivate the threshold voltage reduction, can be provided for the activation and deactivation of the threshold voltage reduction in order to modify the internal supply voltage of the chip. The activation or deactivation can be assigned, for example, to a specific bit in a storage location in a working memory of the microprocessor or microcontroller of the chip, wherein an internal supply voltage unit of the chip is activated accordingly by means of the bit.

The field strength value of the external field strength of the external electromagnetic field, which field strength value is indicated in the sensor register of the chip, obviously refers to the field strength value at the location of the chip card; for coupling with the external electromagnetic field, the chip card usually has corresponding components operating as one or more antennas, such as, for example, a coil integrated into the card body of the chip card and/or into a chip module of the chip.

Typical electromagnetic field strengths for communication between the chip of the chip card and a contactless reader (PCD or CL reader) are, for example, within a range between 1.5 A/m and 7.5 A/m.

The chip can have, for example, a microcontroller or microprocessor as an integrated circuit; in principle, the integrated circuit could also implement all the necessary functions as pure hardware logic and could, for example, be implemented as an application-specific integrated circuit (ASIC) or field programmable gate array (FPGA).

The sensor register values should be evaluated at sufficiently short time intervals in order to ensure the optimum regulation of the internal supply voltage of the chip. The threshold voltage must be adjusted on this basis and, if necessary, shunt resistors must be switched on or off to consume any excess power in the chip. On the basis of the following technical considerations, the inventors propose to design the timing of the evaluation of the sensor register values as follows.

A chip card usually starts to operate as from a distance of approximately 5 cm from the center position of the PCD or POS terminal. At a distance of 3 cm from the center position, the field strength prevailing at the location of the chip card exceeds 2 A/m in the case of most POS terminals. The maximum speed of movement as the chip card approaches the POS terminal is approximately 0.59 m/s for an arm of the user of the card; this speed of movement applies to linear movements only, i.e. without stopping. This means that the regulation must be configured within a range of 2 cm for a field strength range from 0 A/m to 2 A/m. This results in a time window of less than 200 ms in which a sufficiently accurate regulation must be carried out. In order to ensure this regulation, the sensor register should be evaluated every 35 ms at the latest.

The field strength value in the sensor register of the chip of the chip card can be evaluated intermittently, preferably at a time interval of 30 to 40 ms, particularly preferably approximately every 35 ms. The above steps A to C are carried out on this basis, i.e. the threshold voltage is activated or deactivated as intended or as required.

A particularly efficient implementation entails using the S(WTX) or SWTX (Frame Wait Time Extension Request) command of the T=CL protocol according to ISO/IEC 7816-4 as a trigger for continuous evaluation of the sensor register. The SWTX command is a request for more time to process a command, i.e. an extension of a predetermined wait time to prevent the communication from being interrupted. This eliminates the need for further interrupts or continuous checks of the sensor register.

The sensor register is preferably checked before the S(WTX) request is transmitted. This offers the advantage that the behavior of the load modulation can be adjusted depending on the field strength. In one preferred embodiment, this means that the sensor register is evaluated before the S(WTX) request is transmitted.

The chip preferably has connectable internal or external shunt resistors, which can be connected to or disconnected from the chip depending on the present power consumption of the chip and the external field strength in order to dissipate excess energy. The connection or disconnection of the shunt resistors to/from the chip can be controlled by means of a corresponding shunt register, the bits of which are assigned in each case to a specific shunt resistor and, for example, a set bit ("1") interconnects the associated shunt resistor and the chip such that part of the presently excess power in the shunt resistor is converted into heat.

According to the invention, the above method is implemented as a software regulation in the hardware logic, for example a microcontroller or microprocessor or an ASIC or FPGA, in the chip of the chip card.

A second aspect of the invention relates to a computer program (product) comprising commands which, when the program is executed by a computer, in particular a microcontroller or microprocessor in a chip of a chip card, cause said chip to carry out the steps of the method according to the first aspect of the invention.

A third aspect of the invention relates to a (computer-readable) storage medium, in particular in the form of a program storage area of a chip of a chip card, in which commands are stored which, when executed by a computer, in particular a microcontroller or microprocessor in a chip of a chip card, cause said chip to carry out the steps of the method according to the first aspect of the invention.

A fourth aspect of the invention relates to a method for configuring the chip of a chip card with a computer-readable storage medium according to the third aspect of the invention. The internal supply voltage of the chip is reducible and increasable once more on the basis of the field strength of an external electromagnetic field supplying the chip with power through activation and deactivation of a reduction in the threshold voltage of an internal supply voltage of the chip, in particular in a threshold register. The chip has a sensor register which indicates a field strength value that depends on the external field strength of the external electromagnetic field and on whether the threshold voltage reduction is activated or deactivated. The method comprises the following steps:

a step a, comprising determining the field strength values in the sensor register depending on the external field strength when the threshold voltage reduction is deactivated, i.e. the internal supply voltage is not reduced, over a field strength range;

a step b, comprising determining the field strength values in the sensor register depending on the external field strength when the threshold voltage reduction is activated, i.e. the internal supply voltage is reduced, over the field strength range;

a step c, comprising predetermining a first switching threshold, below which the threshold voltage reduction is activated for the first time, and subsequently above which the threshold voltage reduction is deactivated once more for the first time;

a step d, comprising predetermining a second switching threshold, below which the threshold voltage reduction is to be activated once more, wherein the second switching threshold is lower than the first switching threshold; and a step e, comprising storing the first switching threshold and the second switching threshold in the storage medium of the chip.

The field strength range can be defined from 0 A/m to 10 A/m, and preferably from 0.5 A/m to 7.5 A/m.

In step d, fluctuations due to the chip card production process and/or to a coil which is connected to the chip and/or due to the connection technology with which the coil is connected to the chip can be taken into account.

The first switching threshold can, for example, be 2 A/m. It has been established that, in the event of fluctuations in the chip card production process, the associated value in the sensor register can shift within a range of +/−0.1 A/m. This range is increased by fluctuations which are caused by the coil as well as by the connection technology that is used for the electrical connection of the coil to the chip. These values are very small for soldering as a connection technology, whereas, for Flexbump technology, these values can be greater, e.g. +/−0.4 A/m.

A fifth aspect of the invention relates to a chip card having a chip of which the supply voltage is reducible through activation and deactivation of a reduction in a threshold voltage of the internal supply voltage of the chip. For this purpose, the chip has:

a sensor register, which indicates a field strength value which is dependent on an external field strength of an external electromagnetic field and the adjusted internal supply voltage;

a storage medium, in which a first switching threshold and a second switching threshold are stored, wherein the second switching threshold is lower than the first switching threshold; and the chip which is configured to carry out a method according to the first aspect of the invention.

The chip card can have a storage area for storing pairs of values having a field strength value in the sensor register and the associated external field strength when the threshold voltage reduction is deactivated, i.e. the internal supply voltage is not reduced, and value pairs having the field strength value in the sensor register and the associated external field strength when the threshold voltage reduction is activated, i.e. the internal supply voltage is reduced.

The respective value pairs having the field strength value in the sensor register and the associated external field strength over the above-mentioned field strength range from 0 A/m to 10 A/m, and preferably from 0.5 A/m to 7.5 A/m, are preferably stored in the storage area when the threshold voltage reduction is activated and when the threshold voltage reduction is deactivated.

With the methods proposed above, a generic chip card can be provided in which an improved stability of the power supply of the chip on the chip card is achieved. This is shown by the fact that the chip "stalls", i.e. has too little power due to undervoltage, less, or no longer at all, internally or the chip is not destroyed or damaged by overheating. The probability is therefore significantly increased that, despite or with fluctuating external field strength, a complete transaction can be carried out with a chip card having the chip according to the invention.

BRIEF DESCRIPTION OF THE DRAWINGS

The invention is explained in detail below by way of example with reference to the attached drawings, in which:

FIG. 6 shows a flowchart of a method according to the invention for adjusting the internal supply voltage of the chip of a chip card based on the field strength of an external electromagnetic field supplying the chip with power for

Figure 7:
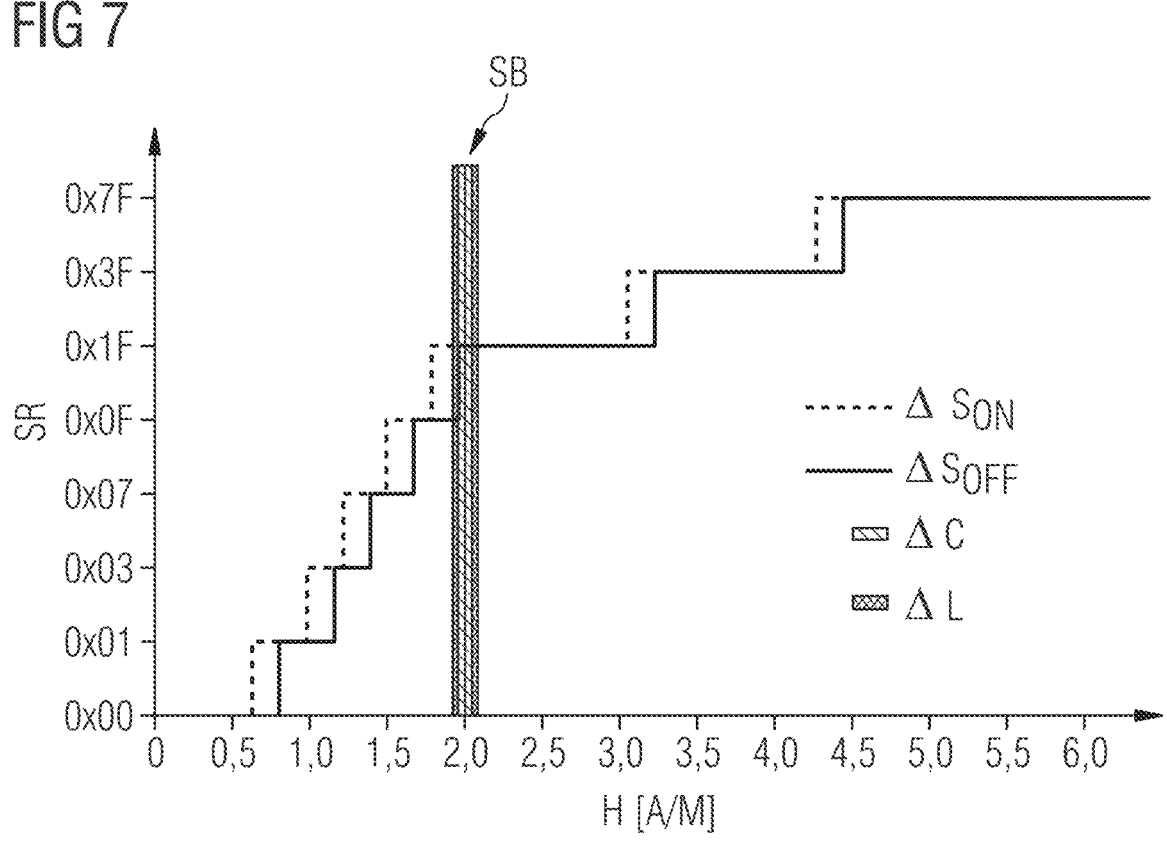

8 carrying out the software-implemented regulation method according to the invention; and FIG. 7 shows an illustration of the regulation method for activating and deactivating the threshold voltage reduction based on the relationships between the field strength indicated in the sensor register and in each case an activated reduction and a deactivated reduction in the threshold voltage.

DETAILED DESCRIPTION OF VARIOUS EMBODIMENTS

Figure 1:
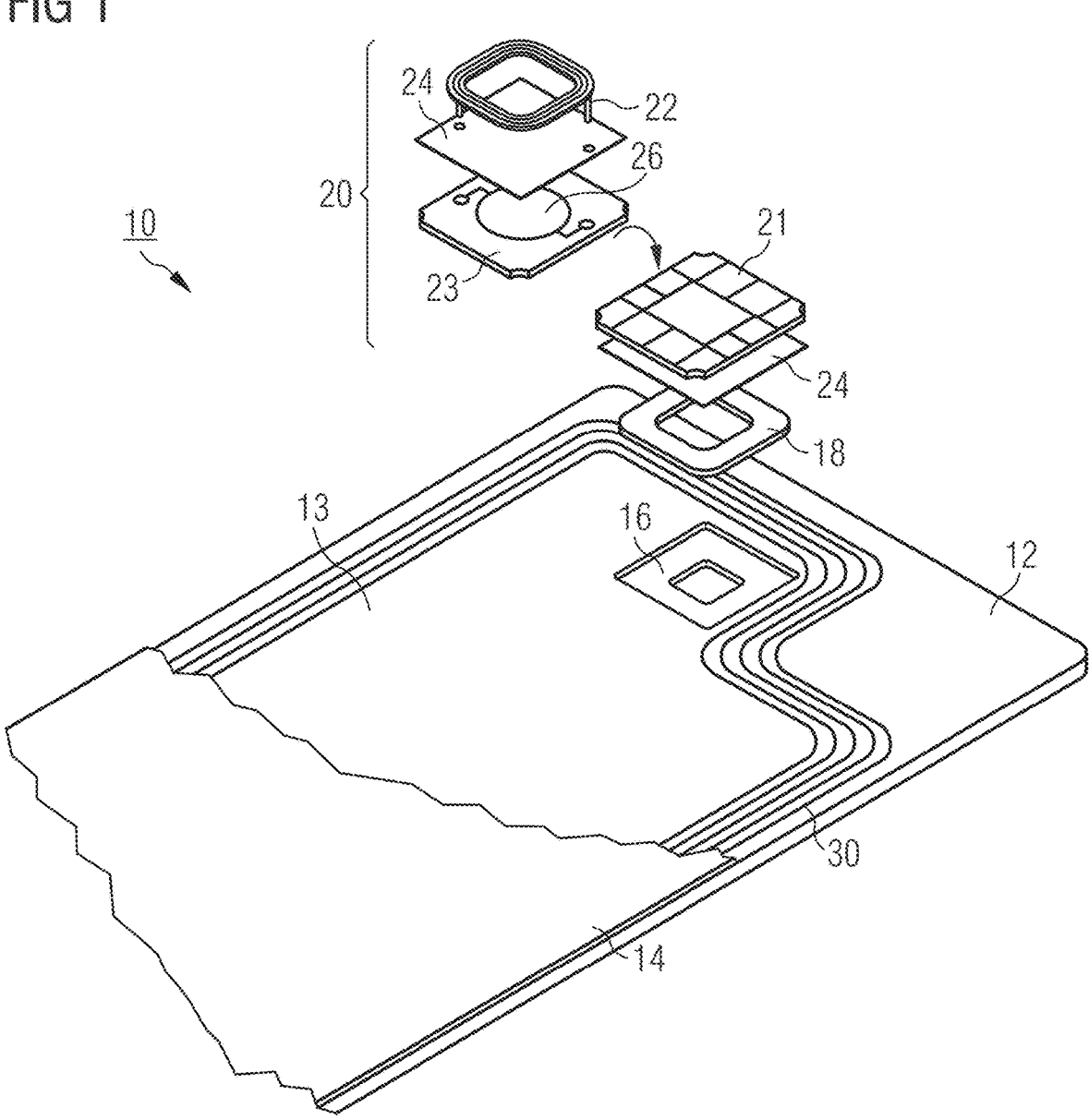
FIG. 1 shows a simplified schematic exploded view of a dual interface (DI) chip card.

FIG. 1 shows, by way of example, the basic design of a dual-interface chip card 10. The example figure originates from: M. Roland and M. Hölzl: "Evaluation of Contactless Smartcard Antennas", Technical Report, Computing Research Repository (CoRR), arXiv:1507.06427 [cs.CR], page 17, University of Applied Sciences Upper Austria, JR-Center u'smile, July 2015.

FIG. 1 shows the chip card 10 having a card body 12. The card body 12 can comprise a metallic layer 13, the main surfaces of which can be covered in each case with a plastic layer 14. The metallic layer 13 can be present, for example, in the form of the core or a layer of a stainless steel alloy having a thickness, for example, of 400 μm. The thickness of the card body 12 can, for example, be between 50 μm and 920 μm.

The chip card 10 further comprises a chip module 20, which is inserted into a recess 16 in the main surface of the card body 12 or the chip card 10. The recess 16 can be a module opening or cavity and can comprise a central blind hole and a circumferential peripheral area. The chip module 20 can be glued in the cavity by means of an adhesive layer or an adhesive pad 18.

In the metallic layer 13, a slot (not shown in FIG. 1) can be provided which extends from a circumferential surface or an outer edge of the card body 12 to the cavity to prevent eddy currents in the metallic layer 13.

The chip module 20 is arranged on a module tape 23 and can be connected to a coil 30, which is also integrated into the card body 12, and/or can itself have a coil 22, wherein a metallic layer or ferrite layer 24 is arranged between a chip 26 and the coil 22. The coil 30 runs around the chip module 20 with approximately 3 to 6 windings in the card plane. The coil 22 runs concentrically around the chip 26 of the chip module 20 with about 12 to 16 windings in the plane of the chip module 20.

Figures 2, 3:
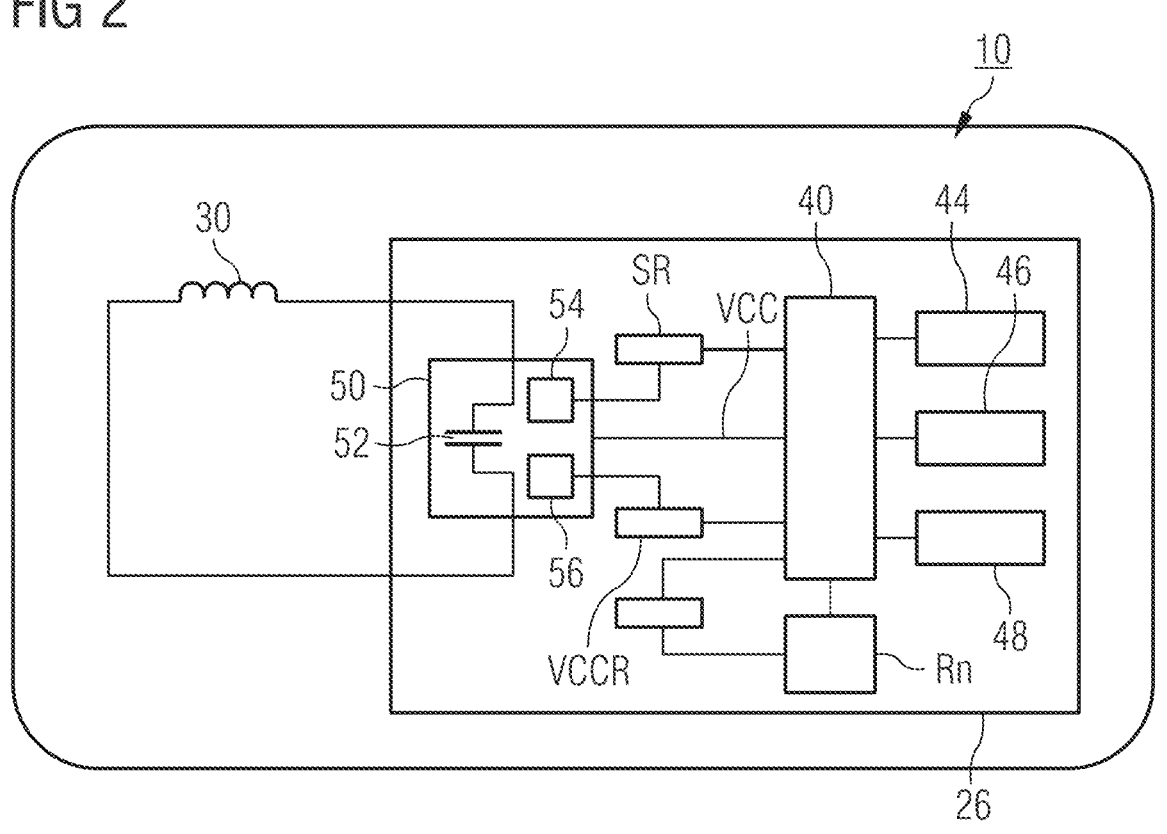
FIG. 2 shows a simplified functional block diagram of a chip module of the chip card shown in FIG. 1.
FIG. 3 shows a simplified view of a chip card in contactless mode which is, for example, presented to a POS terminal for a payment transaction, wherein the POS terminal generates an electromagnetic field for supplying the chip card with power and for communicating with the chip card.

The chip 26 of the chip module 20 can be implemented, for example, in the form of an electronic integrated circuit or circuit and can, for example, be cast in a casting compound and attached to an underside of the chip module 20. The chip module 20 and therefore the chip 26 can be supplied with power contactlessly from an external source and/or can receive or transmit communication signals via the coil 30 or the coil 22. For these purposes, as illustrated in FIG. 3, an external electromagnetic field H can be injected into the coil 30 and/or 22. For example, the chip 26 can be or can contain, inter alia, a chip card controller in the form of a microcontroller or microprocessor with RFID functionality.

To avoid ambiguities, it should be noted that the chip module 20 is shown twice in FIG. 1: Once on the right in the installation position above the recess 16, and above it to the left rotated through 180 degrees to show the rear side. A contact field 21 having metal contacts for contact-based communication and power supply of the chip module 20 is located on the upper side of the chip module 20 shown in the installation position in FIG. 1; the chip card 10 shown in FIG. 1 is therefore configured as a dual interface (DI) chip card in addition to the contactless mode which is of interest here, also for contact-based operation. It is evident that the improvements proposed here essentially relate to generic chip cards in contactless mode and the invention also works with entirely contactless chip cards.

FIG. 2 shows a simplified functional block diagram of the chip card 10 from FIG. 1.

The integrated circuit of the chip 26 of the chip module 20 usually comprises a microprocessor 40 for carrying out control functions for the chip card 10 and for communication and, if necessary, a crypto processor (not explicitly shown) for performing computing operations for security functions. In addition, the integrated circuit includes various memory circuits for storing data and/or making data available. A RAM memory 44 is therefore provided as a short-term working memory for the microprocessor 40, a ROM memory 46 for the operating system of the microprocessor 40, and an EEPROM or EAPROM memory 48 as an application memory for applications of the chip card 10.

A wireless interface unit 50 is connected in FIG. 3 to the coil 30 from FIG. 1 and further comprises a capacitor 52. The coil 30 is connected to the capacitor 52 of the wireless interface unit 50. The inductance of the coil 30 and the capacitance of the capacitor 52 form a resonant circuit which is designed for a specific carrier frequency for wireless communication with the chip 26 of the chip card 10 as well as the wireless power supply; the carrier frequency can, for example, be 13.56 MHz.

The wireless interface unit 50 further comprises a sensor 54, which is configured to measure a physical quantity which correlates with the field strength of an external electromagnetic field H, which is coupled to the oscillating circuit comprising the coil 30 and the capacitor 52. The field strength value measured by the sensor 54 is written continuously by the wireless interface unit 50 to a sensor register SR of the chip 26; as noted elsewhere, a register can essentially be a writable storage location and can therefore also be located in the RAM memory 44 of the chip 26. However, it can also be a dedicated hardware register of the microprocessor 40. In FIG. 2, the sensor register SR is shown explicitly as an independent unit purely in the interests of clarity.

The wireless interface unit 50 further comprises a voltage adjusting unit 56, which is configured to adjust the internal supply voltage VCC of the chip 26. In the example shown, the wireless interface unit 50 also comprises all functions for supplying the chip 26 with the internal supply voltage VCC fed from the external electromagnetic field H.

The voltage adjusting unit 56 is configured to provide a predetermined "normal" supply voltage VCC from outside when the chip 26 is activated and the power supply is sufficient. The voltage adjusting unit 56 can be controlled by means of a supply voltage register VCCR through activation or deactivation of a voltage threshold reduction for the internal supply voltage VCC by means of the supply voltage register VCCR. As a result, the chip 26 can start even in a weaker external electromagnetic field H due to the reduction in the internal supply voltage VCC and can thus be made ready more quickly for operation.

Finally, the chip 26 also has internal or external shunt resistors, which can be connected to or disconnected from the chip 26 depending on the prevailing difference between the power drawn from the external field H and the power presently converted by the chip 26 in order to dissipate excess power as heat and thus prevent overheating and damage to the chip 26. The shunt resistors can also be controlled by means of a dedicated shunt resistor register SR-R, whereby individual bits of the register control the connection or disconnection of an assigned shunt resistor; as noted above in connection with the sensor register SR, a register can essentially be a writable storage location and can therefore also be located in the RAM memory 44 of the chip 26. However, it can also be a dedicated hardware register of the microprocessor 40. In FIG. 2, the shunt resistor register SR-R is explicitly shown as an independent unit purely in the interests of clarity.

FIG. 3 illustrates how the chip 26 can communicate with a reader 60 of a POS terminal outside the chip card 10 by means of the oscillating circuit as an antenna. A control circuit 61 of the reader 60 is also configured to build up an electromagnetic field H similarly by means of a coil 64 and thus inject power into the coil 30 of the chip card 10, by means of which the integrated circuit of the chip 26 is activated and operated. The wireless interface unit 50 of the chip card 10 generates the internal supply voltage VCC for the chip 26 by means of the external electromagnetic field H of the reader 60.

The microprocessor 40 of the chip 26 starts as from a minimum electromagnetic field strength. The operating frequency and therefore the processing speed of the microprocessor 40 can increase as the field strength increases. No further increase in the operating frequency takes place beyond a certain electromagnetic field strength. The microprocessor 40 is then saturated and operates at maximum frequency. If more power than is convertible by the microprocessor 40 is injected by means of the field strength of the external electromagnetic field H, this power must be consumed via switchable shunt resistors Rn in order to avoid damage to the chip 26.

Figures 4, 5:
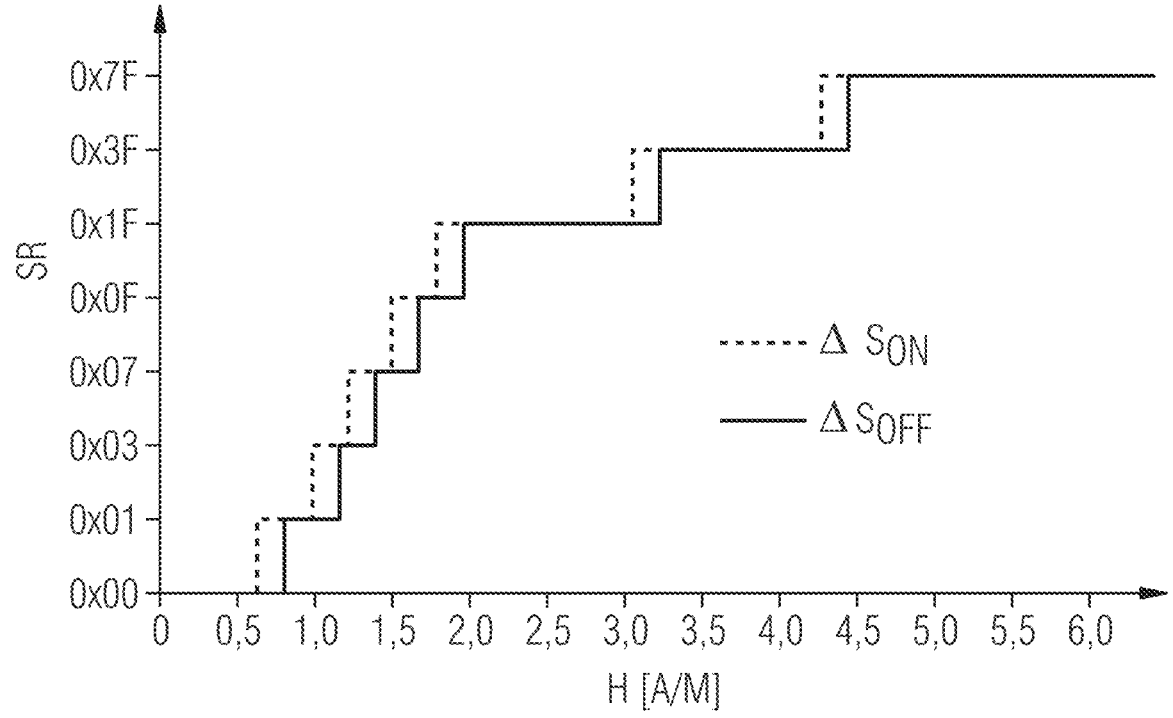
FIG. 4 shows a flowchart of a method according to the invention for configuring the chip of a chip card for the application of the software-implemented regulation method according to FIG. 6.
FIG. 5 shows an example of a view of the relationship between the external field strengths in the sensor register of the chip of a chip card determined by the method shown in FIG. 4 in the case of an activated reduction and in the case of a deactivated reduction in the threshold voltage.
Figure 6:
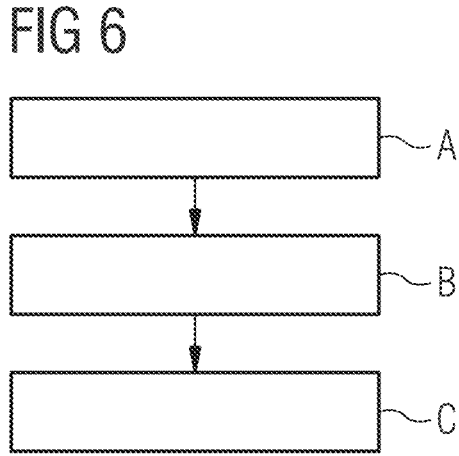

FIG. 4 shows a flowchart of a method according to the invention for configuring the chip of a chip card for the application of the software-implemented regulation method according to the invention shown in FIG. 6.

With the method explained below, for example, the chip 26 of the chip card 10 in FIGS. 1-3 can be used for the application of the software-implemented regulation method for stabilizing the internal supply voltage of the chip 26, wherein the internal supply voltage of the chip 26 can be reduced and increased again based on the field strength of an external electromagnetic field H supplying the chip 26 with power through activation and deactivation of a reduction in the threshold voltage of the internal supply voltage through the corresponding writing of a threshold register of the chip 26. For this purpose, the chip 26 has the sensor register SR, which indicates the field strength value which is dependent on the external field strength of the external electromagnetic field H and on whether the threshold voltage is currently activated or deactivated.

The method for configuring the chip 26 comprises the following steps:

In a first step a, it is determined how the sensor register SR behaves depending on the field strength present at the location of the chip card 10. The threshold voltage is not reduced in this step. This means that, in step a, pairs of values are determined between the field strength value indicated in the sensor register SR and the actual external field strength when the threshold voltage is deactivated, i.e. the internal supply voltage VCC is not reduced. The determined value pairs can be stored in a storage area of the chip 26 of the chip card 10 for further use.

In a second step b, the process is repeated, but the threshold voltage reduction is now activated.

These measurements are preferably carried out in steps a and b within a field range from 0.5 A/m to 7.5 A/m.

In a step c, a first switching threshold is predetermined, below which the threshold voltage reduction is intended to be activated for the first time, and subsequently above which the threshold voltage is deactivated once more for the first time.

In a step d, a second switching threshold is predetermined, below which the threshold voltage reduction is intended to be activated once more, wherein the second switching threshold is lower than the first switching threshold (0x0F).

In a step e, the first switching threshold and the second switching threshold are stored in the storage medium of the chip so that these values are available for future use in the operation of the chip card 10.

FIG. 5 shows an example of the relationship between the external field strength of the external electromagnetic field H and the values indicated in the sensor register SR of the chip 26 of the chip card 10 determined with the method from FIG. 4 explained above, in each case for activated reduction $\Delta S_{ON}$ and for deactivated reduction $\Delta S_{OFF}$ of the threshold voltage.

FIG. 5 shows that the values of the sensor register SR depend on the field strength of the external electromagnetic field H as well as on the adjusted internal supply voltage.

The chip 26 starts even earlier when the threshold voltage reduction is active $\Delta S_{ON}$. The sensor register SR of the chip 26 already shows an external field strength value 0x01 at 0.6 A/m, and already shows the value 0x03 at an external field strength of 1.0 A/m. Conversely, with a normal internal supply voltage, i.e. when the threshold voltage reduction is deactivated $\Delta S_{OFF}$, the sensor register indicates the value 0x03 only at 1.3 A/m.

It is evident from FIG. 5 that the sensor register SR indicates a lower value when the threshold voltage reduction is deactivated $\Delta S_{OFF}$. To prevent the chip 26 from overheating internally due to the reduced threshold voltage of the internal supply voltage VCC, the threshold voltage reduction must be deactivated, e.g. at 2 A/m at the latest.

FIG. 6 shows a flow diagram of a method according to the invention for adjusting the internal supply voltage of the chip of a chip card based on the field strength of an external electromagnetic field supplying the chip with power for implementing the software-implemented regulation method according to the invention.

The method shown in FIG. 6 is implemented by the chip 26 of the chip card 10 and serves to adjust the internal supply voltage VCC of the chip 26 based on the field strength of the external electromagnetic field H supplying the chip 26 with power. The internal supply voltage VCC can be reduced by activating and deactivating a threshold voltage reduction. As shown, for example, in FIG. 2, the chip 26 has the sensor register SR, which indicates a field strength value which depends on the current external field strength and the currently adjusted internal supply voltage VCC.

The method itself comprises the following steps:

In a step A, the threshold voltage reduction is activated for the first time as soon as the field strength value indicated in the sensor register SR is lower than the predetermined first switching threshold—in the example: 0x1F.

In a step B, the threshold voltage reduction is deactivated for the first time as soon as the field strength value indicated in the sensor register SR is greater than or equal to the first switching threshold—in the example: 0x1F.

In a step C, a predetermined second switching threshold—in the example: 0x07—is set for each further activation of the threshold voltage reduction, wherein the first switching threshold—in the example: 0x1F—is retained for each further deactivation of the threshold voltage reduction. The second switching threshold—in the example: 0x07—is lower than the first switching threshold—in the example: 0x1F.

FIG. 7 illustrates the considerations behind the software-implemented regulation method according to the invention for activating and deactivating the threshold voltage reduction based on the relationships between the field strength indicated in the sensor register in each case when the threshold voltage reduction is activated and the threshold voltage reduction is deactivated.

In FIG. 7, a switching range SB is marked at 2 A/m. Fluctuations $\Delta C$ in the production process of the chip 26 were found to cause a shift in the value in the sensor register SR within a range of +/−0.1 A/m. This range is increased by the fluctuations $\Delta L$, which are caused by the coil 30 or 22 and also by the connection technology that is used. In the case of a soldered connection technology, the fluctuation values are very low, whereas higher values of +/−0.4 A/m were noted in the case of the Flexbump or Flexible Bump technology, for example.

FIG. 7 shows that, in the example of the chip card 10, the sensor register SR can assume the value 0x1F in a field strength range from 1.8 A/m to 2.2 A/m, with the threshold voltage reduction deactivated $\Delta S_{OFF}$. This behavior occurs to the same extent when the threshold voltage reduction is activated $\Delta S_{ON}$. This range cannot be regarded as a "variance".

The first switching threshold was predetermined here at the sensor register value 0x1F. If the sensor register SR indicates a value less than 0x1F, the threshold voltage reduction is activated; at >=0x1F, the threshold voltage reduction should be deactivated once more.

However, FIG. 7 then shows that the sensor register value drops to 0x0F when the threshold voltage reduction is deactivated $\Delta S_{OFF}$, which could immediately result once more in an activation $\Delta S_{ON}$ of the threshold voltage reduction. The inventors therefore propose to reduce the switching threshold for activating the threshold voltage reduction for a further deactivation $\Delta S_{OFF}$ of the threshold voltage reduction in order to avoid an unstable regulation through toggling. In the example scenario illustrated in FIG. 7, the second switching threshold can be set, for example, to 0x07 for the further activation $\Delta S_{ON}$ of the threshold voltage reduction.

As a result, a generic chip card can be improved with the method described above, since improved stability of the power supply of the chip 26 of the chip card 10 can be ensured with the software-implemented regulation of the threshold voltage reduction of the internal supply voltage VCC. As a result, the chip 26 "stalls" less or no longer "stalls" at all when used e.g. at a POS terminal, and the risk of damage due to overheating of the chip 26 is reduced. This therefore increases the overall probability of a complete transaction being carried out with the chip card 10 having the chip 26 according to the invention at a POS terminal 60 with fluctuating external field strength.

The invention claimed is:
1. A method which is implemented by a chip of a chip card for adjusting the internal supply voltage of the chip based on the field strength of an external electromagnetic field supplying the chip with power, wherein the internal supply voltage is reducible through activation and deactivation of a threshold voltage reduction, and the chip has a sensor register indicating a field strength value which is dependent on the external field strength and the adjusted internal supply voltage, wherein the method comprises the following steps:

a step A, comprising activating the threshold voltage reduction for the first time when the field strength value in the sensor register is less than a predetermined first switching threshold;

a step B, comprising deactivating the threshold voltage reduction for the first time as soon as the field strength value in the sensor register is greater than or equal to the first switching threshold; and a step C, comprising setting a predetermined second switching threshold for each further activation of the threshold voltage reduction while retaining the first switching threshold for each further deactivation of the threshold voltage reduction, wherein the second switching threshold is lower than the first switching threshold.

2. The method according to claim 1, wherein the field strength value indicated by the sensor register is evaluated intermittently, and steps A to C are carried out on this basis.

3. The method according to claim 2, wherein the command "Frame Wait Time Extension Request", S(WTX) request, of the T=CL protocol according to ISO/IEC 7816-4 is used as a trigger for a continuous evaluation of the sensor register (SR).

4. The method according to claim 3, wherein the sensor register is evaluated before the S(WTX) request is transmitted.

5. The method according to claim 1, wherein the chip further comprises shunt resistors and a shunt register for controlling the shunt resistors, which can be connected to the chip or disconnected from the chip depending on the present power consumption of the chip, the external field strength and the present internal supply voltage for discharging excess power.

6. A computer program comprising commands which, when the computer program is executed by a computer by a microcontroller in a chip of a chip card, cause said chip to carry out the steps of the method according to claim 1.

7. A storage medium in the form of an internal or external program storage area of a chip of a chip card, comprising commands which, when executed by a computer, by a microcontroller in a chip of a chip card, cause said chip to carry out the steps of the method according to claim 1.

8. A method for configuring the chip of a chip card having a storage medium according to claim 7, wherein the internal supply voltage of the chip can be reduced and increased based on the field strength of an external electromagnetic field supplying the chip with power through activation and deactivation of a threshold voltage reduction and the chip has a sensor register, which indicates a field strength value which is dependent on the external field strength and on whether the threshold voltage reduction is activated or deactivated, wherein the method comprises the following steps:

a step a, comprising determining the field strength values in the sensor register depending on the external field strength when the threshold voltage reduction is deactivated, i.e. the internal supply voltage is not reduced, over a field strength range;

a step b, comprising determining the field strength values in the sensor register depending on the external field strength when the threshold voltage reduction is activated, i.e. the internal supply voltage is reduced, over the field strength range;

a step c, comprising predetermining a first switching threshold, below which the threshold voltage reduction is activated for the first time, and subsequently above which the threshold voltage reduction is deactivated once more for the first time;

a step d, comprising predetermining a second switching threshold, below which the threshold voltage reduction is intended to be activated once more, wherein the second switching threshold is lower than the first switching threshold; and a step e, comprising storing the first switching threshold and the second switching threshold in the storage medium of the chip.

9. The method according to claim 8, wherein the field strength range is defined from 0 A/m to 10 A/m.

10. The method according to claim 9, wherein, in step d, fluctuations due to the production process of the chip card and/or a coil which is connected to the chip and/or due to the connection technology used to connect the coil to the chip are taken into account.

11. A chip card having a chip, the internal supply voltage of which is reducible through activation and deactivation of a threshold voltage reduction, wherein the chip comprises:

a sensor register which indicates a field strength value which is dependent on an external field strength of an external electromagnetic field and the adjusted internal supply voltage;

a storage medium in which a first switching threshold and a second switching threshold are stored, wherein the second switching threshold is lower than the first switching threshold; and an integrated circuit, which is configured to carry out a method according to claim 1.

12. The chip card according to claim 11, wherein the chip card has a storage area in the storage medium for storing value pairs having field strength values to be indicated in the sensor register and the respective associated external field strength when the threshold voltage reduction is deactivated, i.e. the internal supply voltage is not reduced, and for storing value pairs having field strength values to be indicated in the sensor register and the respective associated external field strength when the threshold voltage reduction is activated, i.e. the internal supply voltage is reduced.

13. The chip card according to claim 11, wherein the respective value pairs having the field strength value in the sensor register and the associated external field strength over a field strength range from 0.5 A/m to 7.5 A/m are stored in the storage area when the threshold voltage reduction is activated and the threshold voltage reduction is deactivated.

* * * * *